United States Patent
Frey et al.

(10) Patent No.: US 12,169,436 B2
(45) Date of Patent: Dec. 17, 2024

(54) SERIAL ATTACHED NON-VOLATILE MEMORY

(71) Applicant: SMART Modular Technologies, Inc., Newark, CA (US)

(72) Inventors: Robert Tower Frey, Newark, CA (US); Kelvin Marino, Newark, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 80 days.

(21) Appl. No.: 17/703,362

(22) Filed: Mar. 24, 2022

(65) Prior Publication Data
US 2023/0305922 A1   Sep. 28, 2023

(51) Int. Cl.
*G06F 11/10* (2006.01)
*G06F 1/30* (2006.01)
(Continued)

(52) U.S. Cl.
CPC ............ *G06F 11/1068* (2013.01); *G06F 1/30* (2013.01); *G06F 11/0772* (2013.01);
(Continued)

(58) Field of Classification Search
CPC .... G06F 11/1068; G06F 1/30; G06F 11/0772; G06F 11/0793; G06F 13/4282
See application file for complete search history.

(56) References Cited

U.S. PATENT DOCUMENTS

| 8,626,998 B1 | 1/2014 | Amidi et al. |
| 8,767,463 B2 | 7/2014 | Amidi et al. |

(Continued)

FOREIGN PATENT DOCUMENTS

| CN | 111886584 A | 11/2020 |
| TW | 201941056 A | 10/2019 |

(Continued)

OTHER PUBLICATIONS

Author Uknown, "Byte Addressable Energy Backed Interface," JEDEC Standard JESD245E, Apr. 2022, JEDEC Solid State Technology Association, 190 pages.
(Continued)

*Primary Examiner* — Francisco A Grullon
(74) *Attorney, Agent, or Firm* — Withrow & Terranova, P.L.L.C.

(57) ABSTRACT

Systems and methods for enabling serial attached Non-Volatile (NV) memory are provided. In some embodiments, a method of operation of a computing system including: in an NV Random Access Memory module (NVRAM) having a non-volatile device, a volatile memory device with data, a NV Controller unit (NVC), and a serial host interface, the method includes: receiving a request for data on the serial host interface and providing the requested data, from the volatile memory device with data, on the serial host interface. The method also includes: detecting a disruptive volatile memory event; copying the data of the volatile memory device to the NV device based on the disruptive volatile memory event; and restoring the data of the volatile memory device from the NV device. In this way, Dynamic Random-Access Memory (DRAM) level endurance and speed/latency can be provided while making it NV.

20 Claims, 8 Drawing Sheets

(51) Int. Cl.
*G06F 11/07* (2006.01)
*G06F 11/14* (2006.01)
*G06F 13/42* (2006.01)

(52) U.S. Cl.
CPC ...... *G06F 11/0793* (2013.01); *G06F 11/1402* (2013.01); *G06F 13/4282* (2013.01)

(56) References Cited

U.S. PATENT DOCUMENTS

| | | | |
|---|---|---|---|
| 8,990,489 | B2 | 3/2015 | Amidi et al. |
| 9,754,634 | B2 | 9/2017 | Shen et al. |
| 9,779,016 | B1 | 10/2017 | Shen et al. |
| 10,755,757 | B2 | 8/2020 | Amidi et al. |
| 11,561,739 | B1* | 1/2023 | Marino ............... G06F 11/1446 |
| 2013/0128685 | A1 | 5/2013 | Shen et al. |
| 2016/0378623 | A1* | 12/2016 | Kumar .................. G06F 3/0647 714/3 |
| 2017/0060706 | A1 | 3/2017 | Kinoshita |
| 2018/0239725 | A1* | 8/2018 | Kumar ................ G06F 13/4022 |
| 2019/0243637 | A1* | 8/2019 | Nachimuthu ........... G06F 8/656 |
| 2020/0192798 | A1* | 6/2020 | Natu ....................... G06F 12/12 |
| 2022/0197833 | A1* | 6/2022 | Steinmetz ........... G06F 13/1668 |

FOREIGN PATENT DOCUMENTS

| | | |
|---|---|---|
| TW | 201945953 A | 12/2019 |
| WO | 2018094416 A1 | 5/2018 |

OTHER PUBLICATIONS

Author Unknown, "Coherent Device Attribute Table (CDAT) Specification," Revision 1.01, Oct. 2020, 15 pages.

Author Unknown, "Compute Express LinkTM (CXLTM) Specification," Revision 2.0, Oct. 2020, 628 pages.

Intel, "CXL Type 3 Memory Device Software Guide: System Firmware, UEFI and OS Software Implementation Guide," Revision 1.0, Jul. 2021, 121 pages.

Intel, "Persistent Memory Programming—Application Handling of Dirty Shutdowns," White Paper, Revision V1.0, Jan. 2020, 17 pages.

Rudoff, A. et al., "Persistent Memory in CXL," Persistent Memory + Computational Storage Summit 2021, Apr. 21-22, 2021, Storage Networking Industry Association, 29 pages.

Sainio, A., "Future of Persistent Memory, DRAM and SSD Form Factors Aligned with New System Architectures," Persistent Memory + Computational Storage Summit 2021, Apr. 21-22, 2021, Storage Networking Industry Association, 15 pages.

Sainio, A., "Persistent Memory and NVDIMMs," Flash Memory Summit 2019, May 17, 2019, Storage Networking Industry Association, 45 pages.

International Search Report and Written Opinion for International Patent Application No. PCT/US2023/014719, mailed Jun. 23, 2023, 13 pages.

Office Action for Taiwanese Patent Application No. 112108931, mailed Oct. 12, 2023, 15 pages.

* cited by examiner

SERIAL ATTACHED NON-VOLATILE MEMORY

FIELD OF THE DISCLOSURE

The present invention relates generally to a computing system and more particularly to a system for backup and recovery.

BACKGROUND

Computers are used in virtually all electronics, such as equipment, machinery, and consumer goods. The computers utilize various types of memory for processing, storing, presenting, and generating vital computer data required for proper operation of the electronic equipment and critical needs of users. The vital computer data can be numbers, texts, symbols, images, audio representations, software programs, or any representation stored as unique electrical states or values in various types of memory.

The various types of memory can be classified in one of two basic categories. The first category refers to non-volatile memory and the second category of memory refers to volatile memory. The non-volatile memory, once written with the vital computer data, is considered be permanently written until intentionally modified by a user or programs and unaffected by loss of power to the computer system.

The volatile memory, once written with data, is permanent as-long-as specific operating conditions are met. One such condition is the requirement of continuous power applied to circuitry of the volatile memory to prevent loss of vital computer data. Another condition is a requirement to periodically recharge or re-energize the circuitry in the volatile memory to prevent loss of the vital computer data.

There are significant costs and performance differences between the volatile memory and the non-volatile memory. Typically, the volatile memory has fewer circuitry, costs less, and can be written to or read from faster than the non-volatile memory of similar size. The non-volatile memory does not have the conditions of the volatile memory to maintain permanence of the vital computer but costs more, has more circuitry, and can be slower to read from or written to in comparison to the volatile memory of the same size.

The demand for the computers with vital computer data results in product trade-offs that require a combination of both volatile memory and non-volatile memory. Reliability and security of the vital computer data in the computers is required. Thus, with increasing demands for computers with improved reliability, availability, and data security, it is imperative that the vital computer data be protected from loss and available when needed by the computers.

In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

Systems and methods for enabling serial attached Non-Volatile (NV) memory are provided. In some embodiments, a method of operation of a computing system including: in a NV Random Access Memory module (NVRAM) having a non-volatile device, a volatile memory device with data, an NV controller unit (NVC), and a serial host interface, the method includes: receiving a request for data on the serial host interface and providing the requested data, from the volatile memory device with data, on the serial host interface. The method also includes: detecting a disruptive volatile memory event; copying the data of the volatile memory device to the NV device based on the disruptive volatile memory event; and restoring the data of the volatile memory device from the NV device. In this way, Dynamic Random-Access Memory (DRAM) level endurance and speed/latency can be provided while making it NV with the use of e.g., NAND Flash over a serial host interface. Power loss events can be monitored and reacted to in order to ensure the DRAM device contents are saved to the NAND Flash without their content being lost. In this way, the NVC can collaborate with the memory buffer to provide the appearance of a DRAM-only storage device while the device is in actuality a persistent DRAM storage device.

In some embodiments, a computing system includes: a NVRAM having a NV device, a volatile memory device with data, a non-volatile controller unit (NVC), and a serial host interface. The NVC is configured to: receive a request for data on the serial host interface and provide the requested data, from the volatile memory device with data, on the serial host interface. The NVC is also configured to: detect a disruptive volatile memory event; copy the data of the volatile memory device to the NV device based on the disruptive volatile memory event; and restore the data of the volatile memory device from the NV device.

In some embodiments, the non-volatile device includes a NAND Flash device. In some embodiments, the non-volatile device includes a Phase Change Memory (PCM), Resistive Random Access Memory (RERAM), Magnetoresistive Random Access Memory (MRAM), Nano Random Access Memory (NRAM), etc. device. In some embodiments, the volatile memory device with data includes a DRAM device. In some embodiments, the serial host interface includes a Peripheral Component Interconnect Express (PCIe) interface. In some embodiments, the serial host interface includes a Compute Express Link (CXL) interface. In some embodiments, the serial host interface includes one or more of the group consisting of: an OpenCAPI Memory Interface (OMI); a Cache Coherent Interconnect for Accelerators (CCIX) interface; and a Gen-Z interface.

In some embodiments, detecting the disruptive volatile memory event includes detecting a power loss event. In some embodiments, the power loss event is scheduled. In some embodiments, the power loss event is unscheduled.

In some embodiments, the method also includes, in response to detecting the disruptive volatile memory event, providing power to the volatile memory device while copying the data of the volatile memory device to the NV device.

Certain embodiments of the invention have other steps or elements in addition to or in place of those mentioned above. The steps or elements will become apparent to those skilled in the art from a reading of the following detailed description when taken with reference to the accompanying drawings. Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
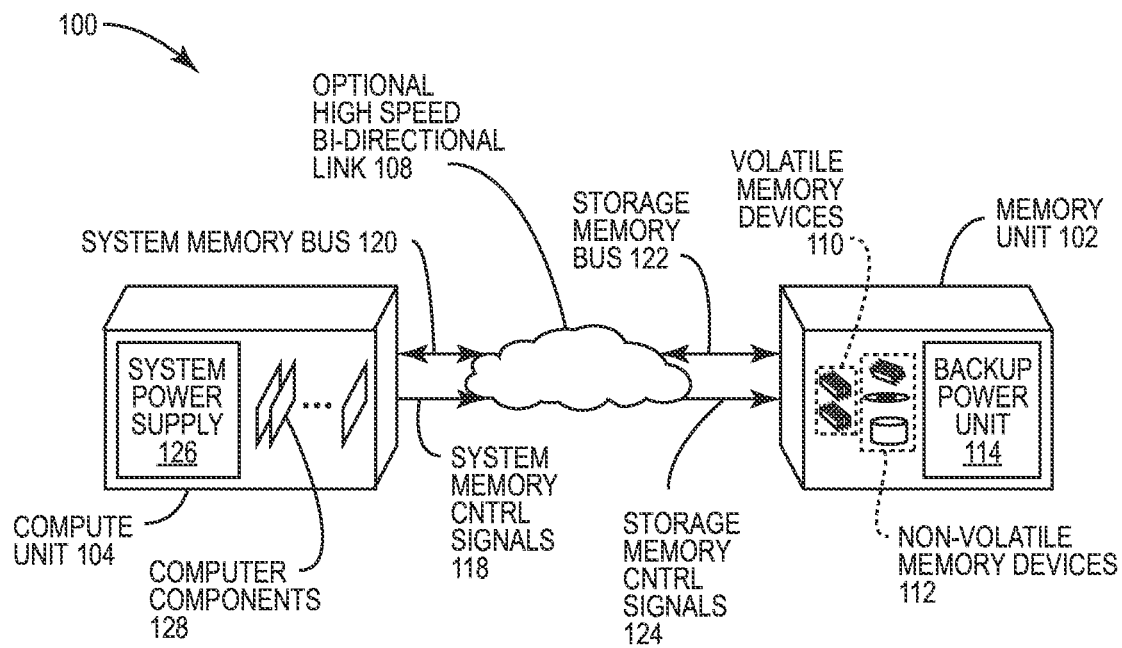
FIG. 1 is a computing system with memory unit having a backup and recovery or restore mechanism in an embodiment of the present invention.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The term "unit" referred to herein includes hardware in the present invention in accordance with the context in which the term is used. For example, the hardware can include circuitry, programmable circuitry, computer, integrated circuit, integrated circuit cores, a pressure sensor, an inertial sensor, a microelectromechanical system (MEMS), passive devices, or a combination thereof.

The term "autonomously" is defined as hardware capable of independently operating, responding, and reacting to an event or condition without assistance from any other hardware, software, or combination thereof, external to the hardware. Element names in the present invention having the term "command" is defined to always be hardware signals generated by hardware circuitry representing instructions, indicators, or information, sent and decoded by other hardware circuitry, unless specifically described as representing software.

Some embodiments disclosed herein are related to embodiments disclosed in U.S. Pat. No. 9,779,016, filed Jul. 11, 2013, the disclosure of which are incorporated herein by reference in its entirety.

The following description describes NVDIMM (Non-volatile DIMM) which automatically backs up DIMM contents in the event of system power loss. The DIMM contents are restored after power is restored. The description also describes increasing the scope of errors beyond power loss events to include OS (operating system) crashes, CPU faults, MCU (memory controller unit) faults, and MB (motherboard) internal power supply faults. The NVDIMM monitors the CPU, memory controller clock, self-refresh, and power supplies and in the event of detected failures to intelligently and autonomously initiate DRAM self-refresh, switches the memory bus to the NVDIMM, and backs up DRAM data to flash.

Referring now to FIG. 1, therein is shown a computing system 100 with a memory unit 102 having a backup and recovery or restore mechanism in an embodiment of the present invention. The computing system 100 includes the memory unit 102 connecting to a compute unit 104 using an optional high-speed bi-directional link 108. The memory unit 102 is shown having volatile memory devices 110 or DIMM devices, non-volatile memory devices 112 or NVDIMM devices having non-volatile memory, and a backup power unit 114.

The memory unit 102 includes circuitry for detection of an error or disruptive volatile memory events (DVME), backup of data in the volatile memory devices 110 to the non-volatile memory devices 112 before corruption of the data, and restoring of the volatile memory devices 110 with the data backed up from the non-volatile memory devices 112 in an autonomous manner. A DVME is defined as events external to the volatile memory devices 110 that could result in unintended loss of data previously stored in the volatile memory devices 110. Examples of the DVME are the computing system 100 failures that can include an operating system (OS) crash, a central processor unit (CPU fault), a memory controller unit (MCU) failure, mother board (MB) internal power supply faults, a power loss, intermittent power drop-outs, or faults with system memory signals 118 to the volatile memory devices 110.

Examples of the DVME are detected data errors from correctable or non-correctable coding schemes of linear block codes or convoluted codes. In some embodiments, the host writes volatile data to the NVRAM subsystem along with ECC information. The NVRAM subsystem persistently stores the volatile data and ECC information. The volatile data might be corrupted due to transmission errors and/or volatile media errors. After a power-loss type DVME, the NVRAM subsystem will restore the corrupted volatile data and the ECC information. In some embodiments, the host uses the ECC information to correct the volatile data after the restore operation. In some embodiments, the Garbage In Garbage Out (GIGO) model is followed where the NVRAM subsystem, when functioning correctly, restores exactly the volatile data and ECC information that was previously written by the host. In some embodiments, the NVRAM subsystem employs ECC for internal volatile and NV memories to ensure this. Examples of some coding schemes are Error Correction Code (ECC), cyclic redundancy check (CRC) longitudinal redundancy check (LRC), Reed Solomon code (RSC), Bose-Chaudhuri-Hocquenghem (BCH), Low-Density Parity Check (LDPC), or parity errors.

Examples of the DVME for a dynamic random access memory (DRAM) can include control signals, such as bank address, memory controller clock, clock enable, chip select, data mask, RAS, CAS, WE, address, data strobe, or combinations thereof, sent to the DRAM that are ordered-out-of-sequence (OOS). Additional examples of the DVME for DRAMs can be detections of timing violations, such as set-up, hold, or skew violations between any combination of the system memory systems, system memory bus signals, self or auto refresh errors due to missing or invalid sequences, or a combination thereof. Further examples of DVME for DRAMs can include thermal warnings from the volatile memory devices 110 or remote thermal sensors with the memory unit 102 or the computing system 100.

For illustrative purposes, the volatile memory devices 110, the non-volatile memory devices 112, and the backup power unit 114 are shown within the memory unit 102. It is understood that the volatile memory devices 110, the non-volatile memory devices 112, the backup power unit 114, or a combination thereof can be located external to the memory unit 102. For example, the volatile memory and the backup power unit 114 can be located within the compute unit 104 and the non-volatile memory devices 112 can be located in a room separate from a room having the memory unit 102 having circuitry used to process DVME and backup or restore the volatile memory devices 110.

The backup power unit 114 supplies power to the memory unit 102 and can include auxiliary remote backup power units (not shown) to provide power to any remotely located units or circuitry allocated to support functions of the memory unit 102. Circuitry, components, and devices of the memory unit 102 physically at one location or distributed across different locations are self-sustaining and independent the compute unit 104 or other hardware not allocated for use by the memory unit 102 are independent.

For example, the memory unit 102 can operate without any power from other power sources other than the backup power unit 114 and any of the auxiliary remote backup power units allocated specifically for the memory unit 102. The memory unit 102 automatically and independently monitors, detects, or snoops, the environment surrounding and connections to the volatile memory devices 110 to detect the DVME leading to the backup of the data into the non-volatile memory devices 112 from the volatile memory devices 110.

The term "snoop" is defined as a process whereby monitoring circuitry is electrically connected to signals or circuitry of hardware. The monitoring circuitry monitors and analyzes characteristics of the signals or the circuitry of the hardware for abnormalities. The snoop is performed as the signals or the circuitry of the hardware operate and without any impact to the operations or performance of the signals or the circuitry of the hardware.

For illustrative purposes, the computing system 100 is shown having the optional high-speed bi-directional link 108. It is understood that the optional high-speed bi-directional link 108 could be omitted. For example, the compute unit 104 and the memory unit 102 can be implemented in a single framed unit or cabinet to eliminate the need for the optional high-speed bi-directional link 108.

The optional high-speed bi-directional link 108 can be used to electrically connect the system memory bus 120 and the system memory control signals 118 of the compute unit 104 with storage memory bus 122 and storage memory control signals 124 of the memory unit 102, respectively.

The optional high-speed bi-directional link 108 can compensate for signal loss, timing, and skew between a location of the memory and a location of the compute unit 104 using a variety of connections methods. The computing system 100 configured without the optional high-speed bi-directional link 108 would result in the storage memory bus 122 and the storage memory control signals 124 of the memory unit 102 directly connected to the system memory bus 120 and the system memory control signals 118 of the compute unit 104.

Any part of the optional high-speed bi-directional link 108 directly connected between the volatile memory devices 110 and the non-volatile memory devices 112 can be powered by the backup power unit 114. The computer system includes a system power supply 126 dependent on external power sources and independent of the backup power unit 114 and computer components 128 used to provide functionality for the compute unit 104.

It has been discovered that the memory unit 102 with the combination of the backup power unit 114 and the non-volatile memory devices 112 provides the computing system 100 with capabilities to detect conditions leading to loss of data in the volatile memory devices 110 and to preemptively backup the data before loss in to the non-volatile memory devices 112 in an independent and self-sustaining manner.

It has been discovered that the memory unit 102 with the combination of the backup power unit 114 and the non-volatile memory devices 112 provides the computing system 100 with capabilities to restore data from a DVME to the volatile memory devices 110 from the non-volatile memory devices 112 during a powering up of the computing system 100 without any hardware or software assistance from resources not previously designated for use by the memory unit 102.

It has been discovered that the combination of the backup power unit 114 and the non-volatile memory devices 112 for monitoring, backing up, or restoring the volatile memory devices 110 improves performance, availability, and reliability of computing systems as well as reduces hardware/software overhead, costs, and downtime of the computing systems for exceptional customer satisfaction and return on investment (ROI).

Figure 2:
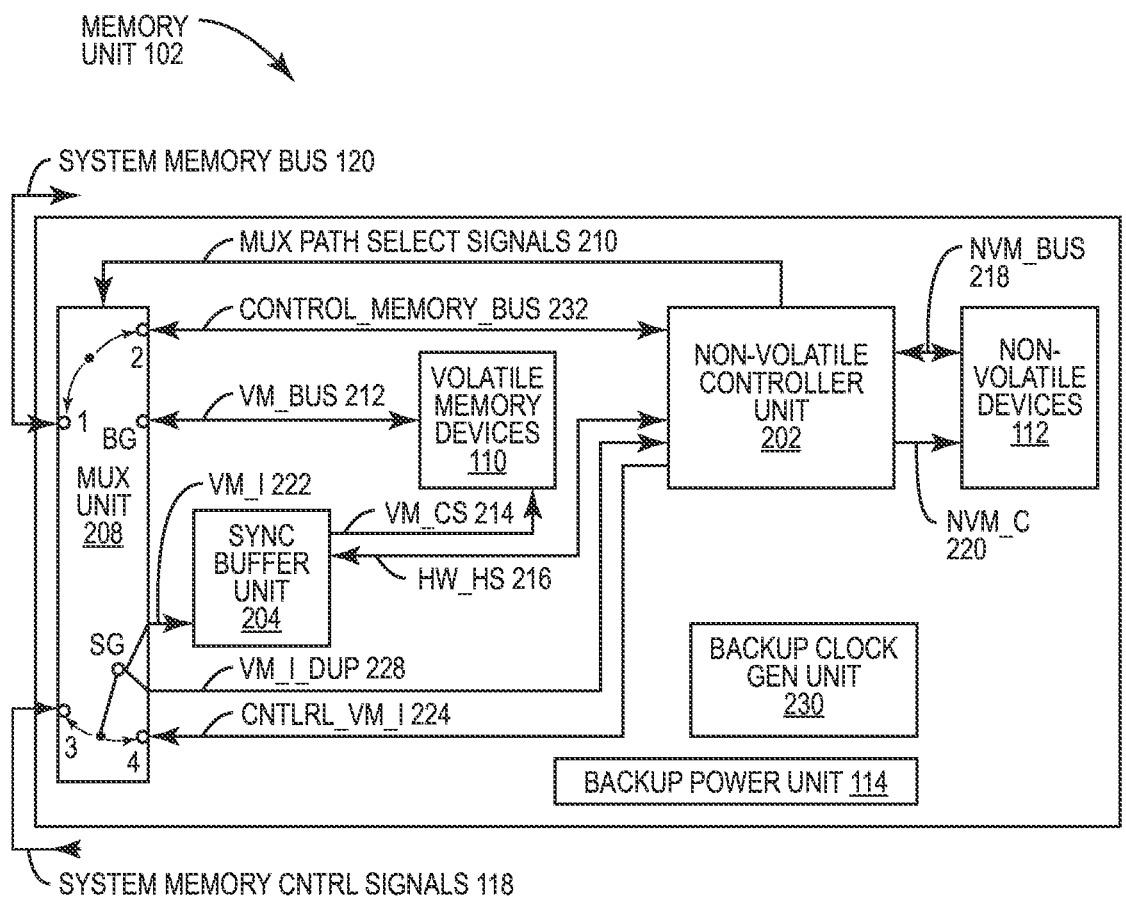
FIG. 2 is an architecture diagram of the memory unit of FIG. 1.

Referring now to FIG. 2, therein is shown an architecture diagram of the memory unit 102 of FIG. 1. The architecture of the memory unit 102 can be implemented entirely in hardware with circuitry and can include software executed in the hardware, by the hardware with circuitry. Architectural functional units in the memory unit 102 providing for the backup or restore mechanisms can include a non-volatile controller unit 202, a sync buffer unit 204, a backup clock generator unit, the backup power unit 114, the volatile memory devices 110, the non-volatile memory devices 112, and a mux unit 208, also referred to as a multiplexor unit.

For illustrative purposes, the memory unit 102 is shown as an integral unit connecting directly to the system memory control signals 118 and the system memory bus 120 from the compute unit 104 of FIG. 1 without the optional high-speed bi-directional link 108 of FIG. 1. It is understood that the optional high-speed bi-directional link 108 could be used to connect the memory unit 102 with the compute unit 104 when the memory unit 102 is located remotely from the compute unit 104.

For illustrative purposes, the multiplexor unit is shown having two separate two-port to one-port pathway multiplexors with each port having any number of signals per port and controlled with mux path select signals 210 to control the path connections and direction between the six ports. It is understood that there can be any number of multiplexor units depending on the number of inputs or outputs of each multiplexor unit. For example, each multiplexor unit could have four-input ports and one-output port. In another example, each multiplexor unit could have eight-input ports and two-output ports.

The volatile memory devices 110 are shown having a bi-directional data bus, shown and referred to as vm_bus 212, used to receive write data to or send out data read from the volatile memory devices 110. The volatile memory devices 110 also receive volatile memory control signals and a synchronized clock, shown and referred to as vm_cs 214, used to control the operation and addressing of volatile memory of the volatile memory devices 110.

The non-volatile controller unit 202, also referred to as nv_controller unit, automatically connects the volatile memory devices 110 to the compute unit 104 during normal operations. The normal operations are defined as periods of operation when there are no detected disruptive volatile memory events, backup operations of data from the volatile memory devices 110 to the non-volatile memory devices 112, or restore operations of data from the non-volatile memory devices 112 to the volatile devices using data and control buses of the non-volatile memory devices 112, respectively labeled as nvm_bus 218 and nvm_c 220.

The non-volatile controller unit 202 automatically configures the memory unit 102 for normal operations by connecting the volatile memory devices 110 with the compute unit 104 by configuring the multiplexor unit to connect the vm_bus 212 with the system memory bus 120 and to connect the system memory control signals 118 with the vm_cs 214 signals of the volatile memory devices 110 through the sync buffer unit 204.

The non-volatile controller unit 202, for example, can receive in-band commands, from the computing system 100 or outside the computing system, to automatically start a back up of all, or optionally a part of, the data in the volatile memory devices 110 to the non-volatile memory devices 112. The in-band commands can be used for purposes of preempting any errors or faults, data archival purposes, data security procedural measures, or for any user defined application and executed without any intervention from hardware or software resources external to the memory unit 102.

The non-volatile controller unit 202, for example, can detect error or fault signals and automatically perform back up of the data in the volatile memory devices 110 to the non-volatile memory devices 112. The error or fault signals detected by the non-volatile controller unit 202 can include signals or indications from the power supplies, the CPU, thermal sensors, the compute unit 104, or any device or unit within the computing system 100.

The non-volatile controller unit 202 can also detect errors based on abnormal signal sequences, electrical characteristics, or timing characteristics during the normal operations of the computing system 100 and automatically perform back up of the data in the volatile memory devices 110 to the non-volatile memory devices 112. The abnormal signal sequences, for example, can include timing violations, missing or extra signal transitions, improper or erratic signal voltage levels, signal noise, or a combination thereof.

The non-volatile controller unit 202 automatically monitors, detects, snoops the error, the status, the control, or clock signals to detect abnormal conditions during the periods of normal operation. The abnormal conditions are defined as intermittent or continuous errors detected in hardware and can, for example, include timing violations, stuck or missing signals, activation of invalid or illegal signal combinations, clock variations or deviations, marginal signal voltage level swings, or any combination thereof of the control signals and clock.

The sync buffer unit 204, also referred to as the synchronization buffer unit, can generate the vm_cs 214 signals from vm_i 222 signals to compensate for fanout, loading, and timing to the volatile memory devices 110. The non-volatile controller unit 202 can independently monitor and compare the vm_cs 214 signals with the vm_i 222 signals. Through hardware handshake signals or hw_hs 216, the non-volatile memory controller unit 202 can verify that the sync buffer unit 204 is operating properly, and on a miscompare, automatically back up data from the volatile memory devices 110 to the non-volatile memory devices 112 without intervention from hardware or software resources external to the memory unit 102.

The sync buffer unit 204 can be used to clock and synchronize the signals with an internal phase lock loop (PLL) to eliminate propagation delay times of control signals received from the multiplexor unit and improve drive strength to increase fan-out of the vm_cs 214 signals to the volatile memory devices 110. The sync buffer unit 204 can also include registers used to buffer the control signals.

For illustrative purposes, the non-volatile controller unit 202 is shown, receiving from the multiplexor unit, a copy of the control signals sent to the sync buffer unit 204, shown and referred to as the vm_i 222 and vm_i_dup 228, respectively. It is understood that the non-volatile controller unit 202 can receive any number of signals from within the memory unit 102 or the computing system 100. For example, the non-volatile controller unit 202 can receive or monitor in-band commands, error, status signals, functional operation, or a combination thereof.

Any of the abnormal conditions generates the disruptive volatile memory events (DVME) indication or condition used by the non-volatile controller unit 202 to automatically initiate a backup procedure of copying data in the volatile memory devices 110 to the non-volatile memory devices 112.

The backup time period is defined as a maximum total time required by the non-volatile controller unit 202 to copy data from the volatile memory to the non-volatile memory of the non-volatile memory devices 112 before any of the data stored in the volatile memory is lost and includes DVME detection and processing times leading to the backup operation. Following the detection of the DVME indication, the non-volatile controller unit 202 can configure the memory unit 102 to receive power from the backup power unit 114 and clocks from the backup clock generator unit, also referred to as a backup clock gen unit 230, can prolong functionality of the memory unit 102 to provide a sufficient backup time period.

The non-volatile controller unit 202 re-configures the multiplexor unit to connect a controller volatile memory input, shown and referred to cntlr_vm_i 224, to the vm_i 222 input of the sync buffer unit 204 using the multiplexor unit. Activating and connecting the backup power unit 114 and the clocks to the memory unit 102 enables synchronous or clocked circuitry in the memory unit 102 to continue to operate.

The synchronous circuitry in the memory unit 102 enables the non-volatile controller unit 202 to perform sequences and operations, as needed, to prevent loss of data over the duration of the backup time period based on type or characteristics of the volatile memory of the volatile memory devices 110. In the event of an in-band command received by the non-volatile controller unit 202 to backup data from the volatile memory to the non-volatile memory, the memory unit 102 could continue to receive the power and clocks from the compute unit 104, as opposed to switching to power and clocks from the backup power unit 114 and the backup clock gen unit 230, respectively.

The volatile memory can be volatile semiconductor devices requiring refresh, such as synchronous dynamic random access memory (SDRAM), double data rate synchronous dynamic random access memory (DDR), or any superseding class types of DDR that can include DDR2, DDR3, DDR4, DDR5 type devices, etc. It is understood that the volatile memory can be other types of volatile memory that do not require refresh or refreshing. For example, the volatile memory devices 110 could be static random access memory (SRAM) which retain data as-long-as power is maintained to the SRAM and do not require any refresh.

The non-volatile controller unit 202 places the volatile memory into a self-refresh operational mode. Sequences of the self-refresh applied to the clock and control signals by the non-volatile controller unit 202 can vary depending on the type, features, or manufacturer of the volatile memory of the memory unit 102.

The non-volatile controller unit 202 can prepare the non-volatile memory of the non-volatile memory devices 112 to receive and store data, also known as write data, from the volatile memory by reconfiguring the multiplexor unit to provide data bus paths from the volatile memory devices 110 to the non-volatile memory devices 112. For example, the non-volatile controller unit 202 can reconfigure the multiplexor unit to connect the vm_bus 212 to the cntlr_mem_bus, also referred to as the controller memory bus 232, using the mux path select signals 210.

In the present embodiment, the non-volatile memory of the non-volatile memory devices 112 refers to flash memory, such as NAND flash memory. It is understood that the non-volatile memory or the non-volatile memory devices 112 can be of other types of readable/writable non-volatile memory devices. For example, the non-volatile memory devices 112 could be data storage drives such as a hard disk drive (HDD), solid state drive (SSD), or a tape drive.

Refresh times are defined as a total of all individual self-refresh cycles needed to guarantee the retention of all of the data stored in the volatile memory devices 110 until the data has been successfully copied over to the non-volatile memory devices 112. The refresh times include the transitions times associated with each of the individual self-refresh cycles including times for the volatile memory devices 110 to switch from a normal operation mode to the self-refresh state until time when the volatile memory devices 110 are re-initialized and transitioned back to a condition ready for read or write operations.

Interval times are defined as a total of all periods of time between successive periods of refresh, such as a self-refresh or auto refresh cycles, used by the non-volatile controller unit 202 to read or copy data from the volatile memory devices 110 to save or backup into the non-volatile memory devices 112. The backup time period includes the totals of the refresh times, the interval times, overhead times such as configuration switching of the multiplexor unit, switching of the power sources, switching of the clock sources, and sequences performed by the non-volatile controller unit 202.

The non-volatile controller unit 202 includes timers to monitor and track the refresh times, the interval times, the backup time period, or any other events needed for proper sequencing or control of all operations associated with the memory unit 102 during the backup operations or any other times of operation. The data targeted in the volatile memory devices 110 to be backed-up is copied into the non-volatile memory devices 112 before the backup time period has elapsed. The backup time period can be used by the non-volatile controller unit 202 to indicate completion of a backup operation to the computing system 100.

The volatile memory unit can be restored with data from the non-volatile memory unit by the non-volatile controller unit 202 without intervention from hardware or software resources external to the memory unit 102 during a restore operation. The restore operation can be automatically performed by the non-volatile memory unit as a result of a power-up or an in-band command received from the computing system 100.

The non-volatile controller unit 202 can be configured to give warning prior to or prevent the restore operation if the cause of the most recent backup was from a DVME that has not been eliminated or addressed. The non-volatile controller unit 202 can determine if the DVME condition has been corrected by monitoring status, signals, or environment of the memory unit 102 and the computing system 100 as a condition for performing a restore operation.

The non-volatile controller unit 202 automatically configures the multiplexor unit to connect the volatile memory bus with the controller memory bus 232 and to connect the controller volatile memory input with the volatile memory control signals, also referred to as the vm_cs 214, of the volatile memory devices 110 through the sync buffer unit 204 for restoration operations. The non-volatile controller unit 202 can optionally configure the memory unit 102 to receive power from the backup power unit 114 or clocks from the backup clock gen unit 230 to restore data restoration in parallel or before the computing system 100 software OS, hardware resources, or any combination thereof is operational.

The non-volatile controller unit 202 can automatically initialize the volatile memory devices 110 for write operations and the non-volatile memory devices 112 for read operations. For example, the volatile memory devices 110 and the non-volatile memory devices 112 can be power sequenced up according their manufactured specifications.

The non-volatile controller unit 202 can automatically configure bus paths within the memory unit 102. For example, the non-volatile controller unit 202 can configure the flow of data from the non-volatile memory devices 112, through the non-volatile controller unit 202, and to the volatile memory devices 110. The non-volatile controller unit 202 can also perform refresh command operations, such as self-refresh or auto-refresh operations, to the volatile memory devices 110 on an as-needed-basis until the restoration or restore operations have completed.

It has been discovered that the non-volatile controller unit 202, the mux unit 208, the backup clock gen unit 230, the backup power unit 114, and the sync buffer unit 204 provides the memory unit 102 with the capability to autonomously perform backup operations of data from the volatile memory devices 110 to the non-volatile memory devices 112 without assistance from resources outside of the memory unit 102 in a self-managed manner.

It has been discovered that the non-volatile controller unit 202, the mux unit 208, and the sync buffer unit 204 provides the memory unit 102 with the capability to perform restoration of the volatile memory devices 110 with data from the non-volatile memory devices 112 without assistance from resources outside of the memory unit 102, such as software, hardware, or operating system of the compute unit 104.

It has been discovered that the non-volatile controller unit 202, the mux unit 208, the backup clock gen unit 230, the backup power unit 114, and the sync buffer unit 204 provides the memory unit 102 with the capability to autonomously perform restoration of the volatile memory devices 110 with data from the non-volatile memory devices 112 without assistance from resources outside of the memory unit 102 in a self-managed, and self-sustaining manner.

Figure 3:
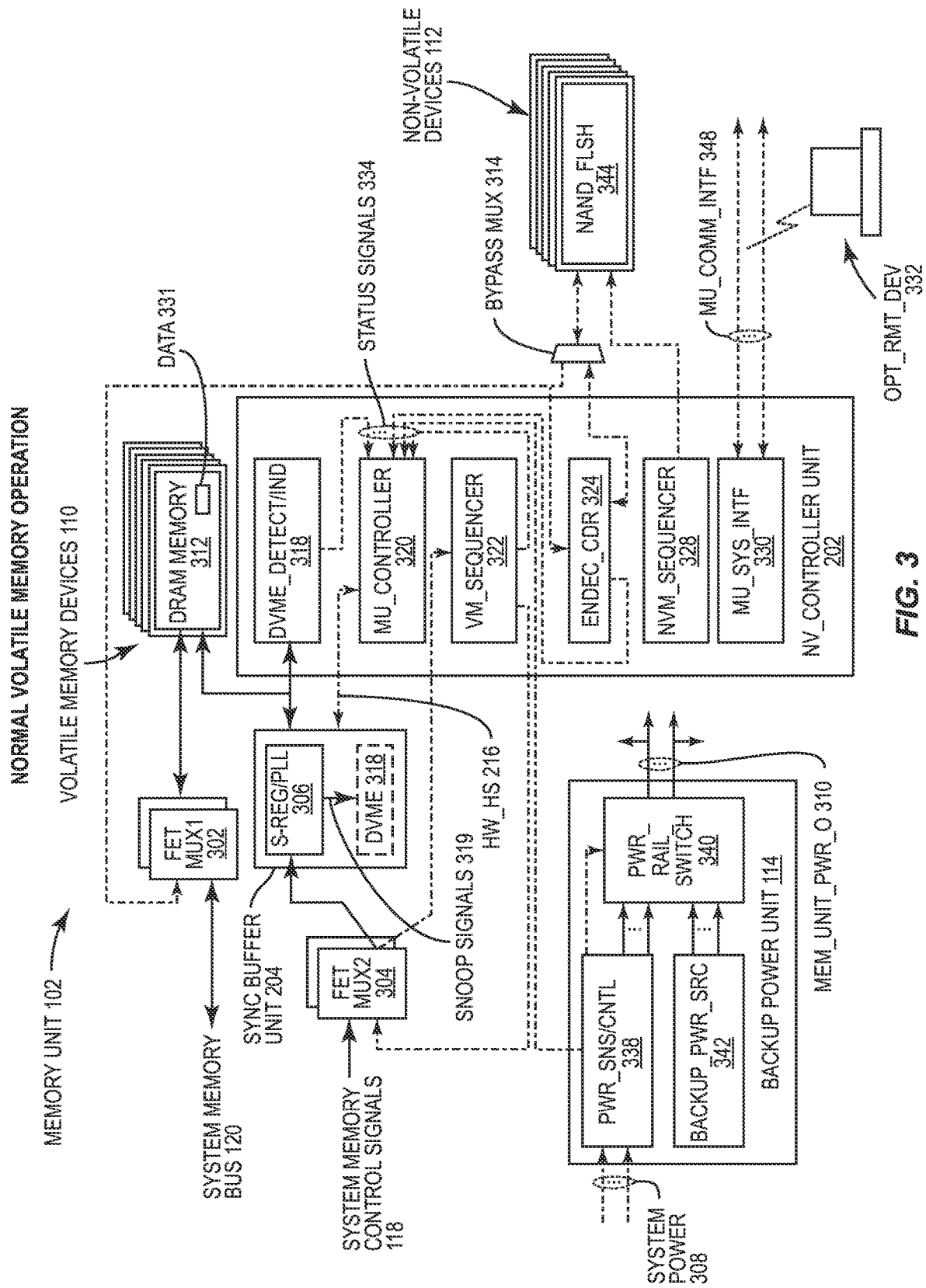
FIG. 3 is an exemplary hardware block diagram of the memory unit of FIG. 2 in the normal operating mode.

Referring now to FIG. 3, therein is shown an exemplary hardware block diagram of the memory unit 102 of FIG. 2 in the normal operating mode. Shown are field effect transistor (FET) multiplexors identified as fet mux1 302 and fet mux2 304, smart register circuitry (S-REG) with a phase lock loop (PLL), also referred to as S-REG/PLL 306, and DRAM hardware circuitry that can be used to implement and control the mux unit 208 of FIG. 2, the sync buffer unit 204, and the volatile memory devices 110, respectively.

Connections, such as wire or traces, are depicted as either solid lines or segmented lines having separated and alternating segment lengths. The solid lines indicate connections representative of the normal operating mode. It is understood that the segmented lines are connections disconnected by the FET multiplexors, such as the fet mux1 302 and the fet mux2 304, monitored or snooped by circuitry and checked for a DVME condition, connections, monitored for a command or instructions from the computer unit, or any combination thereof.

System power 308, such as VDDSPD, VDD, VDDQ, VBULK (could be 12V or 24V), or other voltages, is received from the system power supply 126 of FIG. 1 of the compute unit 104 of FIG. 1, for example, can include voltages seven hundred fifty millivolts, twelve hundred millivolts, fifteen hundred millivolts, eighteen hundred millivolts, twenty five hundred millivolts, or three hundred thirty millivolts. The system power 308 is selected and distributed throughout the memory unit 102 using memory unit power outputs, also referred to as mem_unit_pwr_o 310, sent out of the backup power unit 114.

In the normal operating mode, the DRAM can be read from, written to, and controlled by commands sent from the compute unit 104 using the clock and signals, such as address, commands, controls, and clock, sent from the compute unit to the S-REG using the fet mux2 304. The S-REG with the PLL can be used to increase fan out of the bus signals by increasing signal drive strength of the bi-directional data to or from DRAM memory 312, increase signal drive strength, or compensate for signal, address, or control bit skew.

The S-REG can be also used to decode in-band commands received from the compute unit 104 through the system memory control signals 118. In this example, the PLL and PLL associated circuitry of the S-REG can be used to functions as the backup clock gen unit 230 of FIG. 2. It is understood that the backup clock gen unit 230 can be implemented in hardware circuitry in other ways. For example, the backup clock gen unit 230 can be hardware circuitry implemented and separated from the S-REG circuitry.

The non-volatile controller unit 202, also referred to as a nv controller unit, is shown connected with the segmented lines to the hardware circuitry of the memory unit 102 and can include the backup power unit 114, the volatile memory devices 110, the sync buffer unit 204, the fet mux1 302, the fet mux2 304, and the non-volatile memory devices 112 with a bypass mux 314. The non-volatile controller unit 202 can include the hardware circuitry for a dvme_detect/ind 318, a mu_controller 320, a vm_sequencer 322, an endec_cdr 324, a nvm_sequencer 328, and a mu_sys_intf 330.

During the normal operating mode, the nv controller unit intelligently and automatically monitors for the events in the computing system 100 of FIG. 1 that can result in loss of data 331 stored in the volatile memory devices 110. The nv controller unit can automatically re-configure the memory unit 102 and backup the data 331 stored in the volatile memory devices 110 as a result of a detected DVME or an in-band backup command received using a mu_comm_intf 348 from the compute unit 104 or an optional remote device, also referred to as opt_rmt_dev 332, outside the computing system 100.

The nv controller unit can automatically re-configure the memory unit 102 and backup the data 331 without hardware or software assistance from resources not previously designated for use by the memory unit 102 and without the system power 308 from the compute unit 104. The mu_controller 320, also referred to as the memory unit controller, is hardware circuitry used to receive, filter, consolidate, and analyze events received from status signals 334 within the computing system 100 and monitored by the mu_controller 320 of the non-volatile controller unit 202, described in FIG. 2.

The status signals 334 are outputs from circuitry or sensors from different functional areas used by the non-volatile controller unit 202 to indicate localized conditions within each of the different functional areas. The mu_controller 320 can be connected to the S-REG using a bi-directional communication path, such as an I2c, a proprietary interface, or a system management bus (SMBus). The bi-directional communication path can be used by the mu_controller 320 to snoop the signals from the S-REG to the DRAM memory 312 for proper operation, such as conformance to joint electron devices engineering council (JEDEC) DRAM defined self-refresh state or to permit the mu_controller 320 to send commands to the S-REG for self-refresh and prevent any new commands from prematurely taking the DRAM memory 312 out of the self-refresh state. The bi-directional communication path is the hw_hs 216.

The dvme 318 or dvme_detect/ind 318, the disruptive volatile memory event detector and indicator circuitry, is hardware circuitry operatively integral with the S-REG/PLL 306 and the nv_controller unit 202. The dvme 318 or dvme_detect/ind 318 uses snoop signals 319 to detect specific errors with the system memory control signals 118 sent from the S-REG with PLL to the volatile memory devices 110. The vm_sequencer 322, also referred to as the volatile memory sequencer, can be readied to deliver memory signals to the fet mux2 304 in the event of a backup volatile memory operation or a restore volatile memory operation.

The data 331 stored into the DRAM memory 312 by the computing unit can include an ECC for purposes of detecting, correcting, or a combination thereof, the data 331. For example, eight bits of ECC can be included with every sixty-four bits of the data 331 to detect and correct errors from reading or writing the DRAM memory 312. The endec_cdr 324 hardware circuitry is an encoder and decoder for the coding schemes that optionally may have been included with the data 331 written from the system memory bus 120 to the volatile memory. In some embodiments, DDR5 has two busses of forty bits each with eight bits of ECC, so DDR5 is eighty bits wide instead of seventy-two bits.

The circuitry of the endec_cdr 324, also referred to as the endec_circuit, can be used to check and generate coding schemes during a backup volatile memory operation, a restore volatile memory operation, a read or write of data of the non-volatile memory devices 112, or a combination thereof. The circuitry of the endec_cdr 324 can also provide additional levels of data detection and correction capabilities by applying another level of coding schemes.

For example, hardware circuitry of the endec_cdr 324 could apply a reed Solomon encoder of eight bits for every five hundred and forty bytes of ECC that the system provided, such as the eight bits of ECC can be included with every sixty-four bits of the data 331, to be included in the data 331 as the data 331 is written to the non-volatile memory devices 112. In this example, the reed Solomon encoded data can be decoded, checked, corrected if needed, and removed by the circuitry of the endec_cdr 324 prior to re-writing of the data 331, with the eight bits of ECC included with every sixty-four bits of the data 331, back into the volatile memory devices 110. In some embodiments, other encoders on the NV/Flash media can be BCH and LDPC, for example. The level of ECC required is dependent on the NV Media and the mode of the NV Media. For example, NAND can support Single-Level Cell (SLC), Multi-Level Cell (MLC), Triple-Level Cell (TLC), and Quad-Level Cell (QLC) modes each requiring a stronger level of ECC protection.

The bypass mux 314, also referred to as the bypass multiplexor, can be used to bypass the circuitry of the endec_cdr 324 if the data 331 written from the system memory bus 120 to the volatile memory is without any coding schemes. The nvm_sequencer 328, also referred to as the non-volatile memory sequencer, is hardware circuitry readied to actively deliver non-volatile memory signals to the non-volatile memory devices 112 in the event of a backup volatile memory operation or a restore volatile memory operation.

The mu_sys_intf 330, also referred to as the memory unit system interface, is hardware circuitry used to create communication interfaces between the nv_controller unit and circuitry external to the nv_controller unit. The communication interfaces, for example, can include parallel interfaces or serial interfaces such as inter-integrated circuit or two-wire interfaces (I2C) interfaces.

For example, the serial interfaces can include serial presence detector SPD I2C interfaces, a backup I2C interface, a state control interface, or a combination thereof. The SPD I2C interfaces can be used to determine type or characteristics of a memory module. The backup power unit 114 can include a power sense and control circuit, a power rail switch, and a backup power source supplying power, also shown and referred to as pwr sns/cntl 338, pwr_rail switch 340, and bakup_pwr_src 342, respectively, allocated for use by the memory unit 102 to monitor and sense various voltages received from the compute unit 104.

Following are examples of autonomous self-refresh modes that the present invention can be configured to provide. In a first example, a configuration of non-volatile flash DIMM, also referred to as a NVDIMM, can be used to backup volatile DRAMs. A memory controller, such as the non-volatile controller unit 202 or FPGA, completes all active memory cycles (closes all open rows and banks) and activates signals to trigger self-refresh of the DRAMs.

The memory controller allocates fixed worst case delays for handshaking signals and processing to insure that the self-refresh has begun. The memory controller switches multiplexors, such as analog multiplexors or FETs to configure the connections to/from the NVDIMMs and DRAMs, can be used to quickly re-configure signals and busses between the mu_controller 320 and portions of the memory unit 102 surrounding the mu_controller 320.

The memory controller deactivates signals triggering the self-refresh. The memory controller processes and controls the actual transfer of data, synchronization, and clocking and periodic self-refresh cycles as needed throughout the backup operation until completion.

In another example, registers of the NVDIMM initiates self-refresh process of DRAMs by generating signals to start a self-refresh. The registers handshake to the memory controller that self-refresh is active and operating. The memory controller receives handshake from the registers and proceeds to switch the FETs of multiplexors. The memory controller completes configuring the multiplexors and deactivates the self-refresh to guarantee the clock signals have properly transitioned and back-up can be enabled. Further self-refresh cycles are repeated in the same manner until backup of the DRAM has completed.

In yet another example, registers of the NVDIMM can receive and decode in-band information, such as an address, a command, and a control bus information, to initiate a backup event request. The in-band function, for example, can be a "save" function as shown and defined in FIG. 6. The "save" function results in the NVDIMM placing the DRAM in to a self-refresh mode.

The registers of the NVDIMM sends handshaking signals to indicate to the memory controller the activation of the self-refresh. The memory controller switches the FETs and controls the DRAM to back-up of information from the DRAM to the NVDIMM between self-refresh cycle deactivations as indicated by the handshaking signals. Further self-refresh cycles are indicated to the memory controller to permit the memory controller to switch between backup and switch re-configuring of the FETs until the back-up process has completed. It is to be understood that there are other examples and combinations of autonomous self-refresh modes that would be evident based on the present invention. Many alternatives, modifications, and variations will be apparent to those skilled in the art in light of the aforegoing description and considered within the scope of the present invention.

For illustrative purposes, FIG. 3 depicts the FET multiplexors, the sync buffer unit 204, the backup power unit 114, the nv controller unit, the bypass mux 314, the volatile memory devices 110, and the non-volatile memory devices 112 as separate units of hardware circuitry. It is understood that the separate units can be combined or separated in hardware in differently.

The separate units could be combined, for example, to include all of the separate units into three field programmable gate array devices (FPGA). In another example, only the nv controller unit and the bypass mux 314 could be integrated into a single FPGA. In yet another example, the power sense and control and the power rail switch could be implemented into an application specific integrated circuit (ASIC) module with the backup power unit 114 located external from the ASIC. For illustrative purposes, the non-volatile memory devices 112 are shown as open standards ONFI NAND, Toggle mode NAND flash type memory, or any type of interface including Ball Grid Array (BGA) NVMe SSD, also referred to as NAND flash 344. It is understood that the memory unit 102 can have other types of non-volatile memory devices.

Also, for illustrative purposes, the volatile memory devices 110 are depicted having four of the DRAM memory 312 and the non-volatile memory devices 112 are depicted having four of the NAND flash 344. It is understood that there can be any number of the DRAM memory 312 or the NAND flash 344. For example, the volatile memory devices 110 can include sixteen of the DRAM memory 312 and the non-volatile device can include eight of the NAND flash 344.

It has been discovered that the mu_controller 320 and the dvme detector and indicator circuitry having monitored or snooped information from the vm_sequencer 322 or the hw_hs 216 interface, provides the non-volatile controller unit 202 the capability to not only backup the data 331 in the volatile memory devices 110 but also record detailed information as to what the data 331 may or could have been corrupted by the error or disruptive volatile memory event resulting in no data integrity issues and what the data 331 is correct versus might not be correct.

Figure 4:
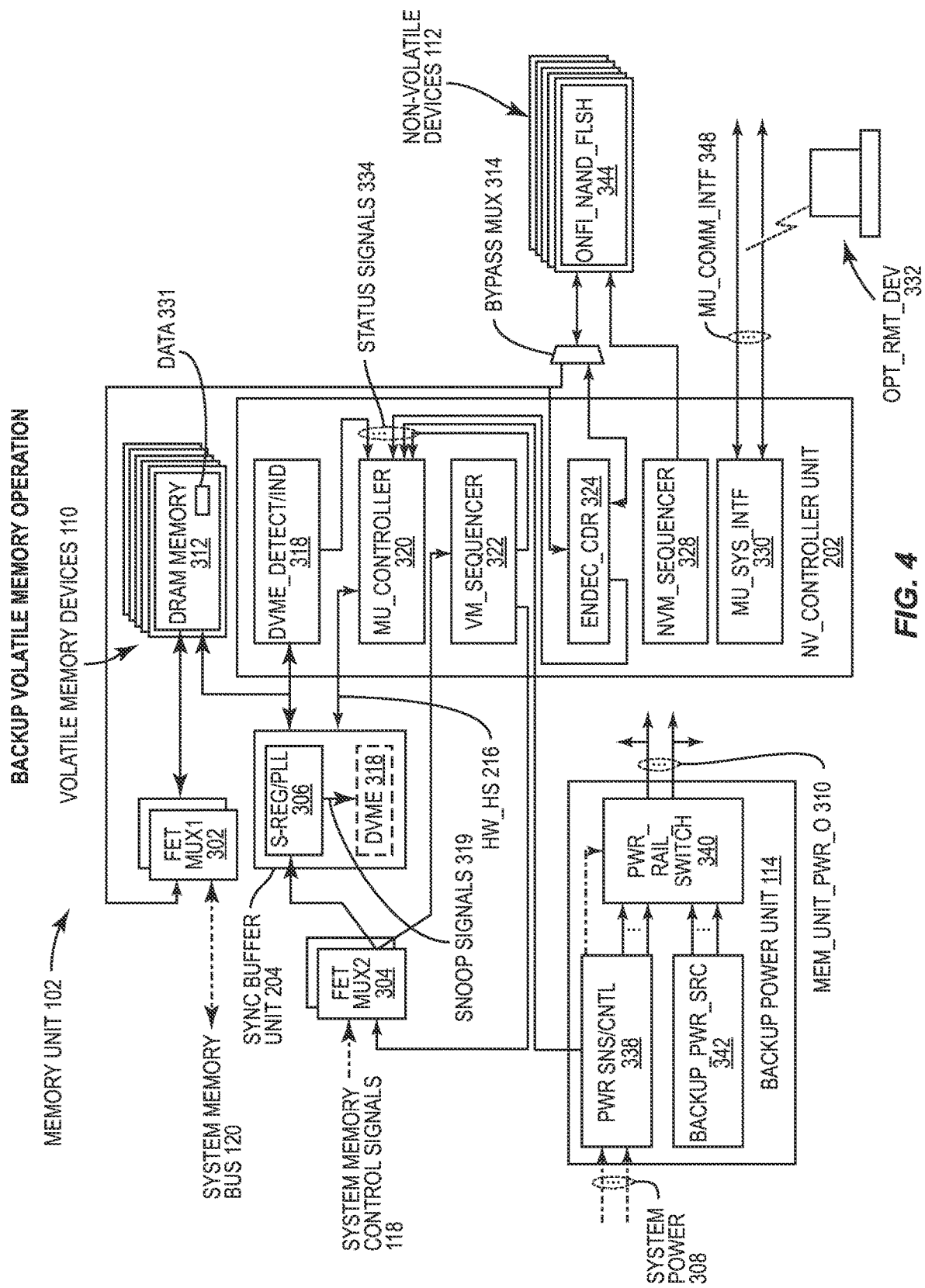
FIG. 4 is the exemplary hardware block diagram of the memory unit of FIG. 3 in the backup operating mode.

Referring now to FIG. 4, therein is shown the exemplary hardware block diagram of the memory unit 102 of FIG. 3 in the backup operating mode. The mu_controller 320 detects at least one DVME or an in-band backup command to backup data. Shown are the sync buffer unit 204, the S-REG/PLL 306, the system memory control signals 118, the pwr sns/cntl 338, the bakup_pwr_src 342, the pwr_rail switch 340, the dvme 318, the dvme_detect/ind 318, and the non-volatile controller unit 202. Also shown are the opt_rmt_dev 332, the status signals 334, the mem_unit_pwr_o 310, and the volatile memory devices 110 with the data 331 to be backed up into the non-volatile memory devices 112, and the NAND flash 344.

For illustrative purposes, the system power 308 connecting to the backup power unit 114 is shown having segmented lines to indicate that the system power 308 is not used and the backup power unit 114 is selected to generate the memory unit power outputs using the power rail switch. If no DVME is detected by the mu_controller 320, it is understood that the system power 308 could have continued to be selected, as in the normal operating mode, to generate the memory unit power outputs.

The solid lines are used to indicate connections established within the memory unit 102 as a result of the DVME. The PLL within the S-REG continues to operate and is distributed to the hardware circuitry of the memory unit 102. The vm_sequencer 322 generates and sends sequences through the fet mux2 304 and the sync buffer unit 204 to the DRAM memory 312.

The DRAM memory 312 is immediately placed into self-refresh mode by the mu_controller 320 to preserve the data 331 previously written into the DRAM memory 312 with no dependency of a clock to the DRAM. The hw_hs 216 of the mu_controller 320 or the vm_sequencer 322 can be used to place or control the self-refresh of the DRAM memory 312. The self-refresh mode is defined as low powered down state of the DRAM where internal data of the DRAM is preserved, minimum power is continuously applied to the DRAM, and access to the internal data is not permitted until the DRAM is re-restored to a normal powered up and initialized state using a powerup/initialization operation described in FIG. 5.

As the DRAM memory 312 is transitioning into the low powered down state from the self-refresh, the mu_controller 320 can use the hw_hs 216, or instruct the nvm_sequencer 328, to initialize and prepare the NAND flash 344 for data write operations. Also, the mu_controller 320 configures the fet mux1 302, the bypass mux 314, and if appropriate, the endec_cdr 324 circuitry for data to be read from the DRAM memory 312 to the NAND flash 344.

Once the DRAM memory 312 has completed the self-refresh and the bus paths between the DRAM memory 312 and the NAND flash 344, the bypass mux 314, and the endec_cdr 324 circuitry have been prepared for backing up of data from the DRAM memory 312, the DRAM memory 312 is powered up and initialized for read operations. The mu_controller 320 copies the data from the DRAM memory 312 to the NAND flash 344 to perform the backup operation.

It is understood that the sequences involved for the backup operation may vary due to the data size, data structure, and physical configuration or specifications of the DRAM memory 312 and the NAND flash 344. For example, it may be necessary to periodically cycle the DRAM memory 312 into additional self-refresh and re-initializations cycles to preserve the data 331 in the DRAM memory 312 until the entire backup of the data 331 in the DRAM memory 312 has been copied into the NAND flash 344.

After the backup operation has completed, the nv_controller unit can sequence down the memory unit 102 and power off the memory unit 102 or perform further operations optionally sent as in-band commands through mu communication interfaces, also referred to as the mu_comm_intf 348, from circuitry of the mu_sys_intf 330. The mu_sys_intf 330 circuitry provides the communication interfaces between the nv controller unit and the computing system 100 or the optional remote device outside the computing system 100.

The mu communication interfaces, also referred to as the memory unit communication interfaces, can include a backup I2C interface, a SPD I2C interface, a general I2C interface, a parallel interface, an interface of control, address, data, or select signals, or any combination thereof. The optional remote device can be another computing system, a smart phone, or any electronic device coupled to the mu communication interfaces through wire, wireless, optical, transport layers, or any form of remote communication and connection medium.

For illustrative purposes, all of connections in the memory unit 102, as-well-as, between the memory unit 102 and the computing system 100 or the optional remote device are depicted with the solid lines. It is understood that some of the solid lines can connected but not used during the powerup and initialization of the computing system 100. For example, the system memory bus 120 can be bypassed by the fet mux1 302 and thus not electrically connected to the memory unit 102 during powerup or initialization.

Figure 5:
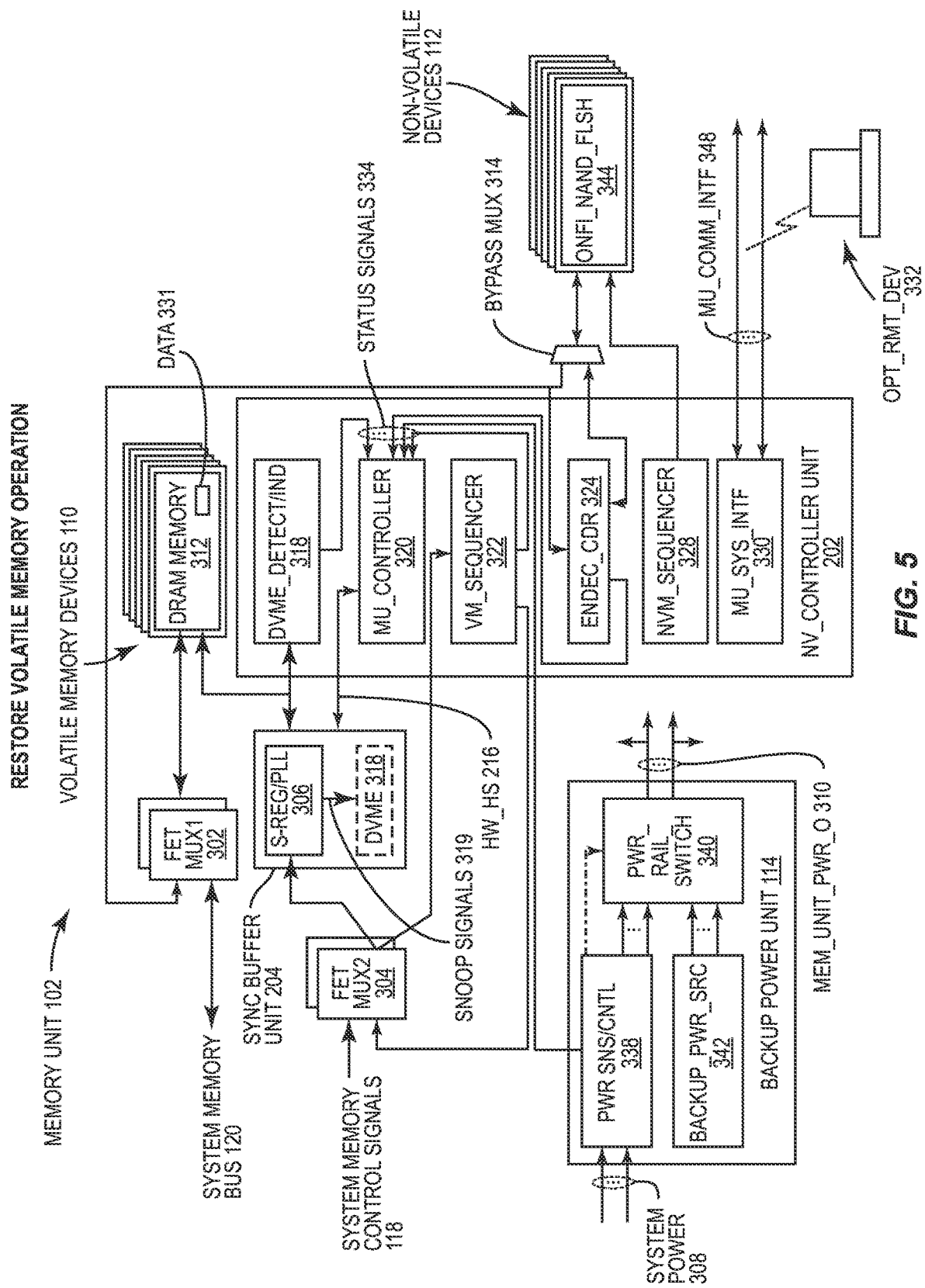
FIG. 5 is the exemplary hardware block diagram of the memory unit of FIG. 3 in the restore operating mode.

Referring now to FIG. 5, therein is shown the exemplary hardware block diagram of the memory unit 102 of FIG. 3 in the restore operating mode. The restore operating mode can be automatically executed without any intervention from hardware or software resources external to the memory unit 102. The restore operating mode can begin as a result of the computing system 100 power-up or an in-band command received by the memory unit 102 from the computing system 100 of FIG. 1, the mu communication interfaces, or the optional remote device.

Shown are the volatile memory devices 110, the non-volatile memory devices 112, the system memory bus 120, the system memory control signals 118, the non-volatile controller unit 202, the NAND flash 344, the hw_hs 216, the sync buffer unit 204, and the S-REG/PLL 306. Also shown are the pwr sns/cntl 338, the bakup_pwr_src 342, the pwr_rail switch 340, the mem_unit_pwr_o 310, the mu_comm_intf 348, the opt_rmt_dev 332, the nvm_sequencer 328, the endec_cdr 324, the vm_sequencer 322, the mu_controller 320, the dvme 318, the dvme_detect/ind 318, the mu_sys_intf 330, and the status signals 334.

The nv_controller unit configures the fet mux1 302, the fet mux2 304, and the bypass mux 314 to connect the data paths between the NAND flash 344 and the DRAM memory 312. The nv_controller unit configures the ONFI NAND flash 344 for read data operations and the DRAM memory 312 for write data operations to restore the data 331 back from the NAND flash 344.

The DRAM memory 312 and the NAND flash 344 are powered-up and initialized using either the system power 308 or the backup power source from the backup power unit 114. For example, if the computing system 100 is powered up, the system power 308 is expected to be available and stable. For example, if the computing system 100 was off-line and a fault causing the DVME has been corrected, the backup power unit 114 can switch from the backup power source to the system power 308. Also, for example, if the computing system 100 is powering up and the backup power unit 114 is stable and available before the system power is available, the backup power unit 114 could deliver power from the backup power unit 114 to ready the DRAM memory 312 before the computing unit has completed boot-up.

It has been discovered that the memory unit 102, with the combination of the backup power source of the backup power unit 114, the non-volatile controller unit 202, the FET multiplexors, the sync buffer unit 204, the bypass mux 314, and the NAND flash 344, and the DRAM memory 312, results in a significantly faster powerup to functional availability time of the computing system 100 over an availability time of a computing system, excluding the memory unit 102 of the present invention to be powerup and functionally available for operation.

Figure 6:
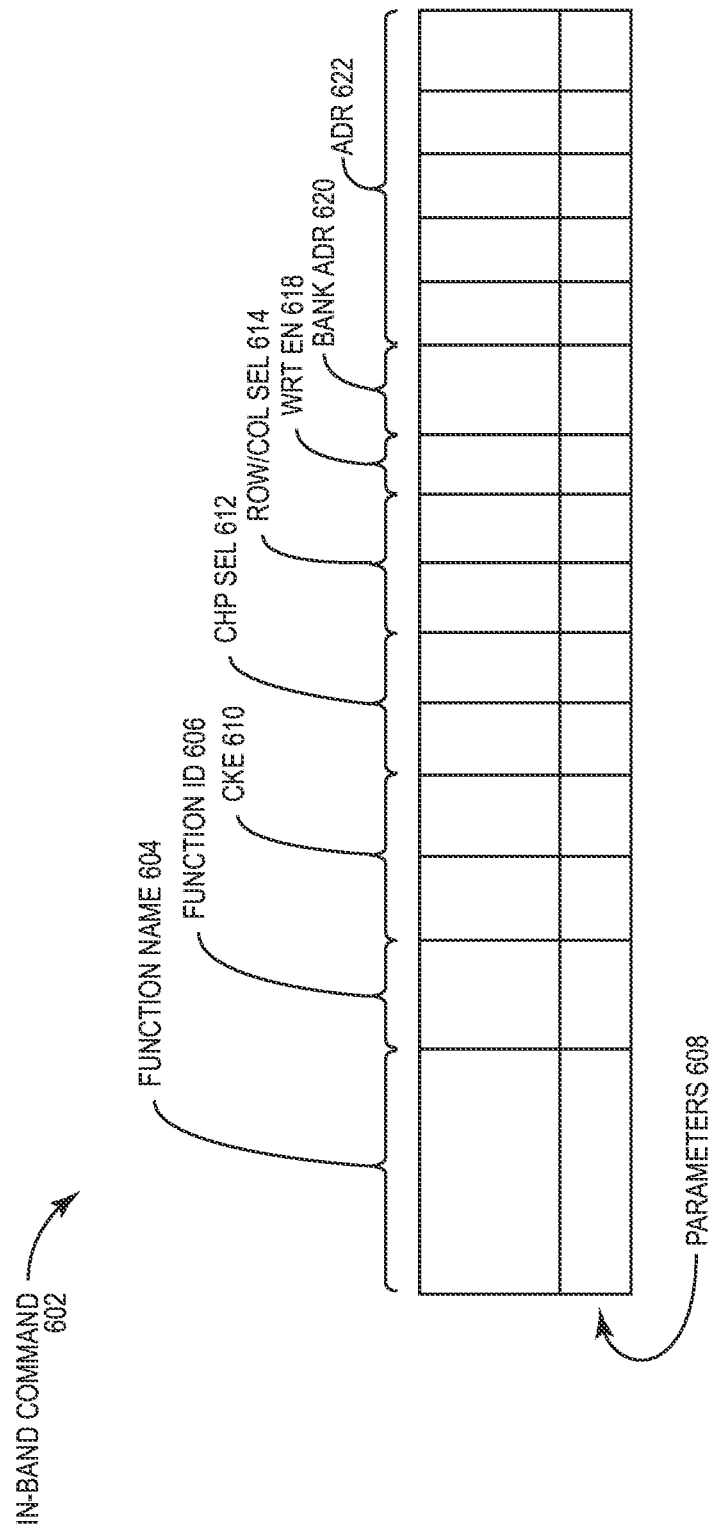
FIG. 6 is an example of an in-band initiated backup command.

Referring now to FIG. 6, therein is shown an example of an in-band initiated command 602. Shown is a portion of the in-band initiated command, such as a backup command, that can be received by the memory unit 102 of FIG. 1 from the system memory bus 120 of FIG. 1 of the compute unit 104 of FIG. 1 or the mu_comm_intf 348 of FIG. 3.

The backup command can be function name 604 and function id 606, such as "save" and "sv", respectively. The backup command can include a specification of parameters 608 such as clock enables 610, chip selects 612, row/column address selects 614, write enable 618, bank adr 620, and addr 622 signals to be sent to the non-volatile memory devices 112 of FIG. 1 to physically control, program, or identify the non-volatile memory devices 112.

In a manner similar to the backup command, a recover or a restore command can be constructed, defined, and implemented to initiate the restore operation. Extra or different parameters fields can be added, substituted, or changed for specific types of the non-volatile memory devices 112 and operations.

Figure 7:
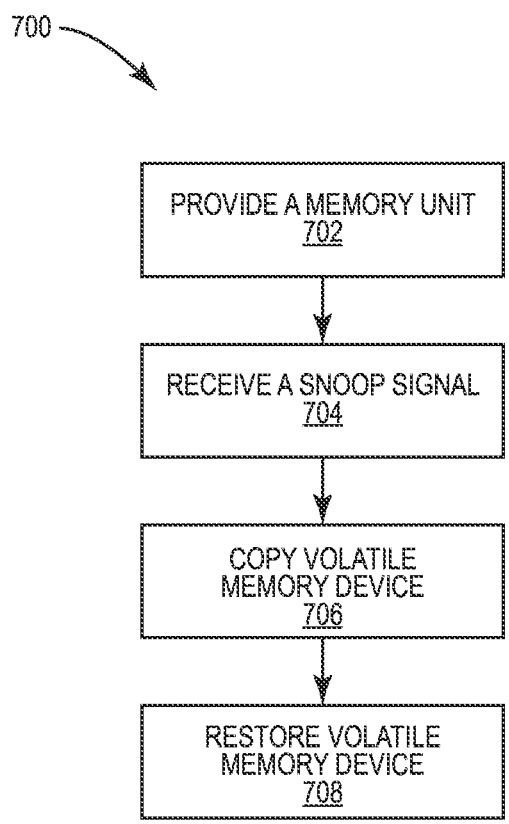
FIG. 7 is a flow chart of a method of operation of the computing system in a further embodiment of the present invention.

Referring now to FIG. 7, therein is shown is a flow chart of a method 700 of operation of the computing system 100 in a further embodiment of the present invention. The method 700 includes: providing a memory unit having a volatile memory device with data and a non-volatile controller unit in a block 702; receiving a snoop signal sent to a memory unit controller of the non-volatile controller unit for indicating an error in a block 704; copying the data of the volatile memory device, synchronously, to a non-volatile device of the memory unit based on the snoop signal, the data autonomously copied without any intervention from outside the memory unit to prevent loss of the data in a block 706; and restoring the data, based on an in-band command received by the memory unit, to autonomously restore the data of the volatile memory device from the non-volatile device without any intervention from outside the memory unit in a block 708.

Systems and methods for enabling serial attached Non-Volatile (NV) memory are provided. In some embodiments, a method of operation of a computing system includes: in an NV Random Access Memory module (NVRAM) having a non-volatile device, a volatile memory device with data, an NV controller unit (NVC), and a serial host interface, the method includes: receiving a request for data on the serial host interface and providing the requested data, from the volatile memory device with data, on the serial host interface. The method also includes: detecting a disruptive volatile memory event; copying the data of the volatile memory device to the NV device based on the disruptive volatile memory event; and restoring the data of the volatile memory device from the NV device. In this way, DRAM level endurance and speed/latency can be provided while making it NV with the use of e.g., NAND Flash over a serial host interface. Power loss events can be monitored and reacted to in order to ensure the DRAM device contents are saved to the NAND Flash without their content being lost. In this way, the NVC can collaborate with the memory buffer to provide the appearance of a DRAM-only storage device while the device is in actuality a persistent DRAM storage device.

Some embodiments disclosed herein provide DRAM level endurance and speed/latency making it non-volatile with the use of NAND Flash over a serial host interface. In some embodiments, power loss events are monitored and reacted to. In some embodiments, the DRAM device contents are saved to the NAND Flash without their content being lost. In some embodiments, this includes the NVC collaborating with the memory buffer to provide the appearance of a DRAM-only storage device while the device is actually a persistent DRAM storage device (or similar). Planned system shutdowns (as well as surprise power loss events) are accommodated to ensure the DRAM data is preserved.

Previous non-volatile memory devices which present DRAM to host and save the contents to NAND flash when power is lost provided either block access over a serial interface (e.g., Peripheral Component Interconnect Express (PCIe)) or byte access over a parallel bus (e.g., DDR) interface to the host. Some embodiments disclosed herein combine a serial host interface access (e.g., PCIe) with byte access (e.g., Compute Express Link (CXL)) to DRAM memory and are still able provide a non-volatile memory solution by saving DRAM contents to NAND flash after power is lost or when commanded. Initiating persistency of the volatile media may be achieved through in band (e.g., Power Management Packets) during a planned or managed shutdown, Out of Band (OOB) signals, detected loss of power, as well as enclosure and other trigger events.

In some embodiments, the RAM, NVRAM, controllers, and backup energy source are all included on one or more modules and may be agnostic to the host interface. In some embodiments, the DRAM, NAND, controllers, and backup energy source are all included on one module.

Figure 8A:
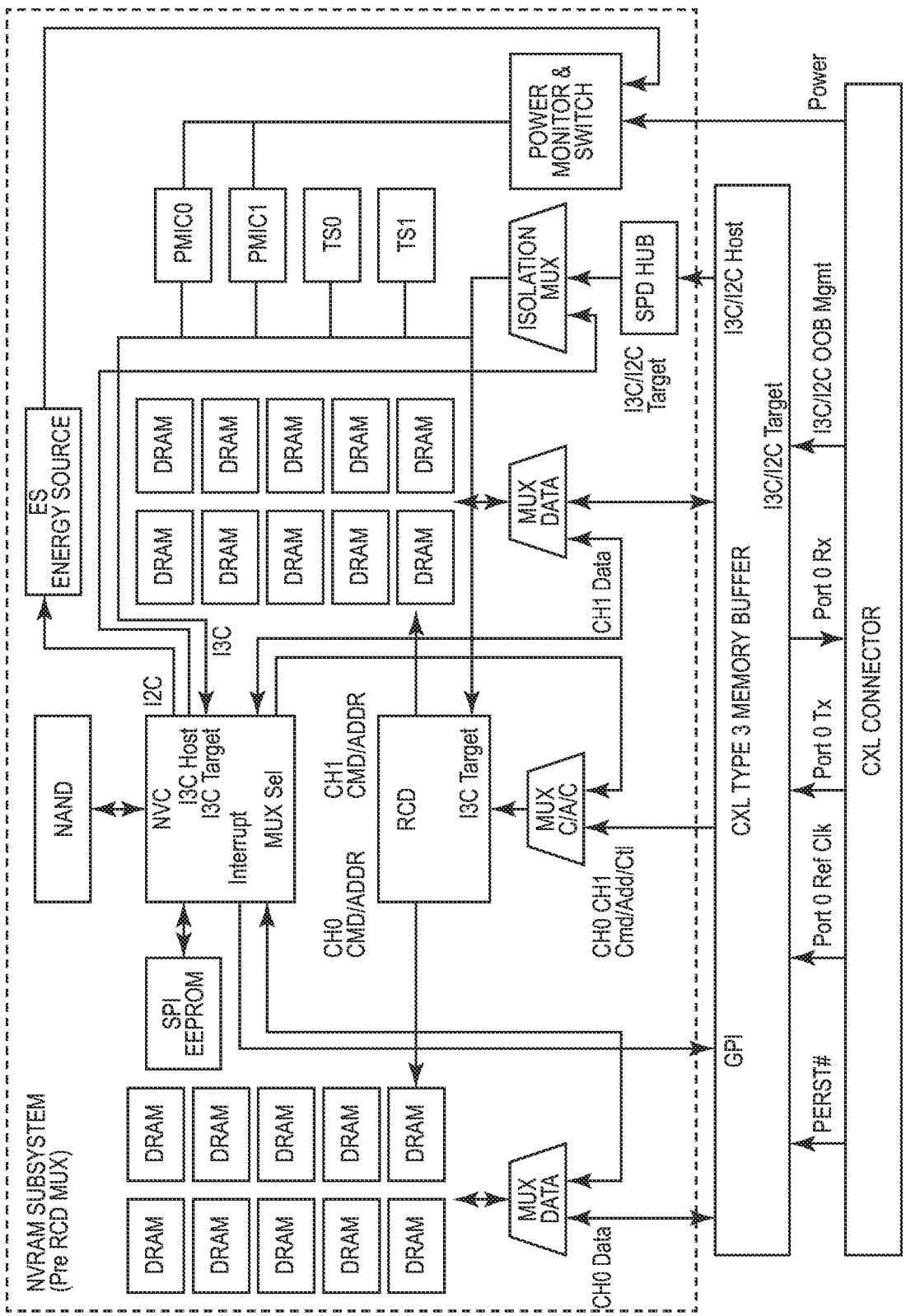
FIGS. 8A and 8B illustrate example implementations, according to some embodiments of the present disclosure.

FIG. 8A illustrates an example implementation, according to some embodiments of the present disclosure. In some embodiments, this includes a reference implementation of CXL Type 3 Non-Volatile RAM device. The CXL Type 3 Memory Buffer is used with a Register Clock Driver (RCD) and the NVRAM Subsystem appears to the memory buffer electrically as a DRAM Subsystem. The Memory Buffer and the NVRAM Controller (NVC) communicate using the I3C Host bus and with an NVC Interrupt. Bi-directional SPI interfaces are also a possibility for the NVC to support. In some embodiments, the NVRAM Subsystem monitors the CXL connector input for power loss events to trigger an NV Save operation. As illustrated in FIG. 8A, the NVRAM Subsystem includes a SPI EEPROM for Label, Namespace, Region, Event Record, and Log storage.

In some embodiments, the NVRAM Subsystem provides temporary power to Memory Buffer to support hand-off of DRAMs with Self-Refresh Entry (SRE) to the NVC.

Figure 8B:
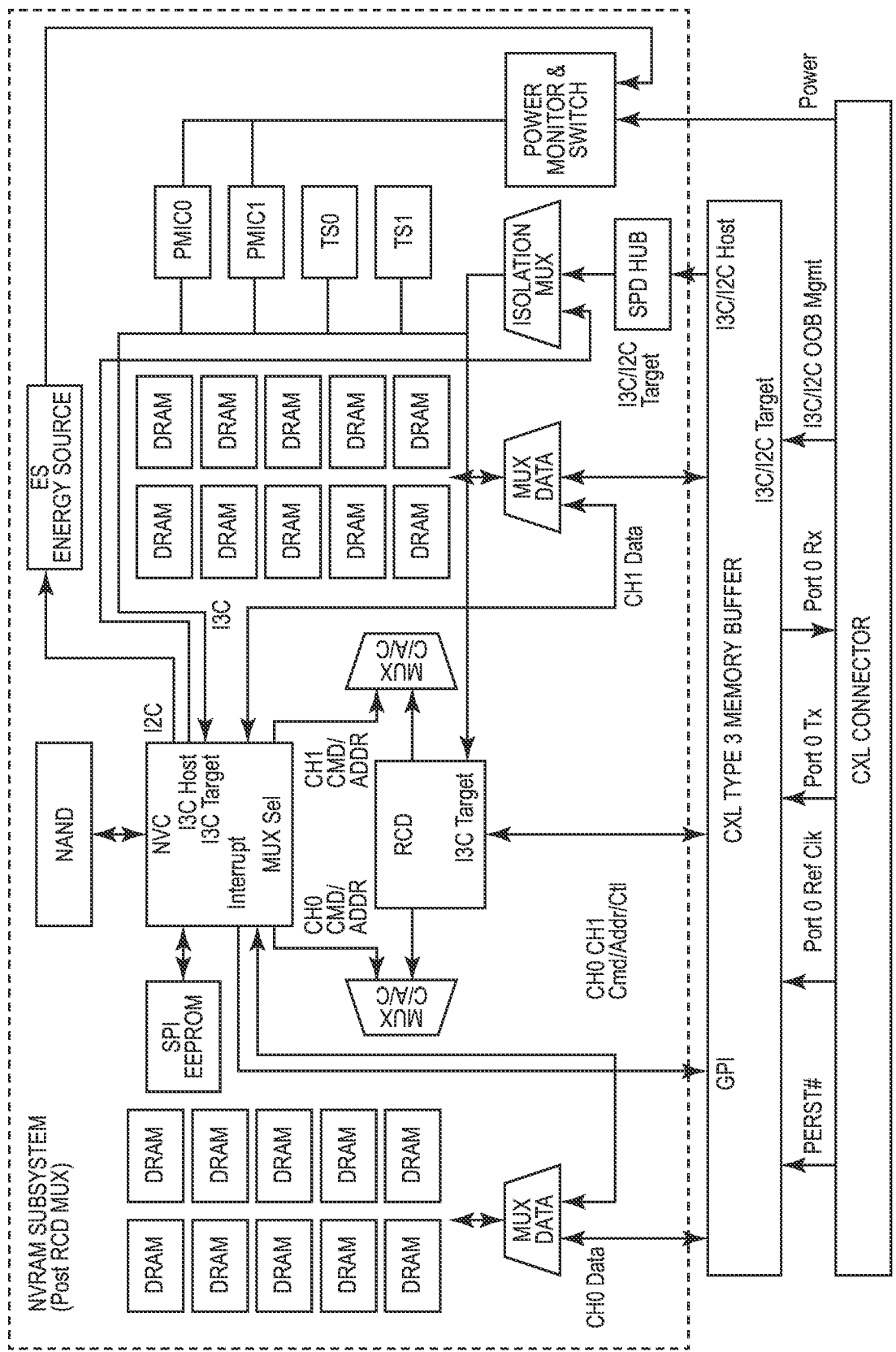

As illustrated in FIG. 8A, a mux is included before the RCD to control the flow of signals. Similarly, FIG. 8B illustrates an alternate embodiment where a mux (or multiple) is included after the RCD to control the flow of signals. In some embodiments, the mux devices can be incorporated into the DRAM devices which would simplify implementation. While PCIe/CXL is used in discussing examples herein, the present disclosure is not limited thereto. Other serial host interfaces such Open Coherent Accelerator Processor Interface (OpenCAPI) Memory Interface (OMI), Cache Coherent Interconnect for Accelerators (CCIX), and Gen-Z could be used in place of PCIe/CXL. The non-volatile storage could be devices other than NAND flash. Any non-volatile storage device could be used instead.

Some embodiments are a CXL Type 3 Persistent Memory (PM) NVRAM module using a CXL Type 4 Memory Buffer in combination with an NVC to provide CXL Type 3 PM NVRAM to a CXL host.

In some embodiments, the NVRAM operates with a standard CXL Type 3 Linux and Windows memory driver for enumeration, configuration, I/O, and management. DRAM equivalent latency and endurance can be provided. The architecture can support multiple form factors.

End-to-End data protection from CXL host through the Memory Buffer, NVC, and on all storage devices: In some embodiments, NV data at rest is encrypted. As discussed above, an on-module (e.g., device managed) or off-module (e.g., host managed) energy source can be included to provide energy for an NV Save operation.

In some embodiments, the memory buffer is to be used with the RCD with 1R/2R/4R (e.g., ranks per DIMM) DRAM topologies, but the present disclosure is not limited thereto. In some embodiments, NV Save/Restore cycles will be infrequent (e.g., fewer than ten times per day).

In some embodiments, the disruptive volatile memory event is one of the following: a managed system shutdown, a system power loss, a managed module hot removal, a CXL module surprise removal, a CXL module managed failure, and a module surprise failure.

For a managed system shutdown, an administrator intentionally shuts down the platform. The CXL Global Persistent Flush (GPF) Phase 1 and 2 may complete successfully. In this example, there is no power loss to CXL module prior to GPF Phase 1 and 2 completion, but the module power may be lost after GPF completion. In some embodiments, the CXL state is set to Clean after a successful NV Save. Similar features are applicable for a managed module hot removal, where the CXL module could also respond to the enclosure button or Enterprise and Datacenter SSD Form Factor Working Group (EDSFF) PWRDIS signal to initiate hot removal and follow other steps described herein. In some embodiments, the PWRDIS signal is asserted by the host to command the device to shut off power to all circuitry connected to the power supply. When PWRDIS is asserted, the host shall allow the device time to shut down. When PWRDIS is de-asserted, the host shall allow the device to settle. If PWRDIS is asserted before a hot plug insertion, then the drive shall not power on. Similar features are applicable for a CXL module surprise removal.

For a system power loss, power is unexpectedly lost to the system. The GPF Phase 1 and 2 may not complete prior to CXL module power loss. If NV Save is successful, the CXL device state is set to Clean. Otherwise, the state will be Dirty at power-on and the Dirty Shutdown Count (DSC) is incremented.

For a CXL module managed failure, a CXL device interrupt is generated and the host processes Event Records. If the NV Save is successful, the CXL device state is set to Clean. Otherwise, the state will be Dirty as described above.

For a module surprise failure, there are many possible failure modes such as: CXL Interface, Memory Buffer, on-board regulator failures, etc. In some embodiments, the CXL device interrupt, host process of Event Records, and GPF Phase 1 and 2 are incomplete or not possible to complete. In these cases, the NVRAM may autonomously perform an NV Save, but set the State to Dirty. The DSC may also be incremented prior to NV Restore. In some embodiments, Management Component Transport Protocol (MCTP) OOB access to the NVRAM subsystem allows event reporting and/or recovery.

In some embodiments, one or more of the following commands are supported: Identify Memory Device-report persistent capacity; Get/Set Label Storage Area (LSA)-partitioning, labelling, namespaces; Get/Set Shutdown State-DSC management; Get Poison List-media failure location reporting; Get Scan Media Capabilities/Scan Media/Get Scan Media Results-media health checking and reporting. In some embodiments, these commands are mandatory.

Additional commands could include: Sanitize-secure rest defaults and clear user data; Secure Erase-change security keys; "Persistent Memory Data-at-rest Security"-Get Security, Set Passphrase, Disable Passphrase, Unlock, Freeze Security State, Passphrase Secure Erase; Security Send; and Security Receive.

Thus, it has been discovered that the embodiments disclosed herein furnish important and heretofore unknown and unavailable solutions, capabilities, and functional aspects. The resulting method, process, apparatus, device, product, and/or system is straightforward, cost-effective, uncomplicated, highly versatile, and effective, can be surprisingly and unobviously implemented by adapting known technologies, and is thus readily suited for efficiently and economically manufacturing the present invention compatible with conventional manufacturing methods or processes and technologies.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. For example, all or portions of the memory unit 102 can be implemented into a field programmable gate array (FPGA), and a DDR3 (or more generally, DDRx) interface and register device function could be incorporated into the FPGA. Conversely, the FPGA function could be incorporated into the register device. In some embodiments, NVC functions can be incorporated into RCD/register device ASIC or any other ASIC as well.

Accordingly, it is intended to embrace all such alternatives, modifications, and variations that fall within the scope of the included claims.

Those skilled in the art will recognize improvements and modifications to the preferred embodiments of the present disclosure. All such improvements and modifications are considered within the scope of the concepts disclosed herein and the claims that follow.

What is claimed is:

1. A method of operation of a computing system comprising: in a Non-Volatile Random Access Memory module (NVRAM) having a non-volatile device, a volatile memory device with data, a non-volatile controller unit, and a serial host interface, the method comprising:
receiving a request for data on the serial host interface;
providing the requested data, from the volatile memory device with data, on the serial host interface;
detecting a disruptive volatile memory event;
copying the data of the volatile memory device to the non-volatile device based on the disruptive volatile memory event; and
restoring the data to the volatile memory device from the non-volatile device;
where providing the requested data comprises providing the requested data with byte access on the serial host interface.

2. The method as claimed in claim 1 wherein the non-volatile device comprises one or more of the group consisting of: a NAND Flash device, a Phase Change Memory (PCM), Resistive Random Access Memory (RERAM), Magnetoresistive Random Access Memory (MRAM), and Nano Random Access Memory (NRAM).

3. The method as claimed in claim 1 wherein the volatile memory device with data comprises a Dynamic Random-Access Memory (DRAM) device.

4. The method as claimed in claim 1 wherein the serial host interface comprises a Peripheral Component Interconnect Express (PCIe) interface.

5. The method as claimed in claim 1 wherein the serial host interface comprises a Compute Express Link (CXL) interface.

6. The method as claimed in claim 1 wherein the serial host interface comprises one or more of the group consisting of: an OpenCAPI Memory Interface (OMI); a Cache Coherent Interconnect for Accelerators (CCIX) interface; and a Gen-Z interface.

7. The method as claimed in claim 1 wherein detecting the disruptive volatile memory event comprises detecting a power loss event.

8. The method as claimed in claim 7 wherein the power loss event is scheduled.

9. The method as claimed in claim 7 wherein the power loss event is unscheduled.

10. The method as claimed in claim 1 further comprising:
in response to detecting the disruptive volatile memory event, providing power to the volatile memory device while copying the data of the volatile memory device to the non-volatile device.

11. A computing system comprising: a Non-Volatile Random Access Memory module (NVRAM) having a non-volatile device, a volatile memory device with data, a non-volatile controller unit, and a serial host interface;
the non-volatile controller unit configured to:
receive a request for data on the serial host interface;
provide the requested data, from the volatile memory device with data, on the serial host interface;
detect a disruptive volatile memory event;
copy the data of the volatile memory device to the non-volatile device based on the disruptive volatile memory event; and
restore the data of the volatile memory device from the non-volatile device;
where providing the requested data comprises providing the requested data with byte access on the serial host interface.

12. The computing system as claimed in claim 11 wherein the non-volatile device comprises one or more of the group consisting of: a NAND Flash device, a Phase Change Memory (PCM), Resistive Random Access Memory (RERAM), Magnetoresistive Random Access Memory (MRAM), and Nano Random Access Memory (NRAM).

13. The computing system as claimed in claim 11 wherein the volatile memory device with data comprises a Dynamic Random-Access Memory (DRAM) device.

14. The computing system as claimed in claim 11 wherein the serial host interface comprises a Peripheral Component Interconnect Express (PCIe) interface.

15. The computing system as claimed in claim 11 wherein the serial host interface comprises a Compute Express Link (CXL) interface.

16. The computing system as claimed in claim 11 wherein the serial host interface comprises one or more of the group consisting of: an OpenCAPI Memory Interface (OMI); a Cache Coherent Interconnect for Accelerators (CCIX) interface; and a Gen-Z interface.

17. The computing system as claimed in claim 11 wherein detecting the disruptive volatile memory event comprises detecting a power loss event.

18. The computing system as claimed in claim 17 wherein the power loss event is scheduled.

19. The computing system as claimed in claim 17 wherein the power loss event is unscheduled.

20. The computing system as claimed in claim 11 wherein the non-volatile controller unit is further configured to:
in response to detecting the disruptive volatile memory event, provide power to the volatile memory device while copying the data of the volatile memory device to the non-volatile device.

* * * * *